United States Patent [19]

Lee

[11] 3,736,514

[45] May 29, 1973

[54] SIGNAL PROCESSING APPARATUS

[76] Inventor: Francis F. Lee, 35 Highland Avenue, Lexington, Mass. 02173

[22] Filed: Mar. 10, 1971

[21] Appl. No.: 122,964

[52] U.S. Cl. ..........................328/55, 328/22, 328/37

[51] Int. Cl......H03k 5/00, H03k 5/159, H03k 19/08

[58] Field of Search ..............................340/347 AD; 179/15 A, 15 BL, 15 AV, 15 T; 333/18, 29, 30; 307/208, 221; 328/168, 172, 173; 330/86; 324/77; 325/38; 343/5 DP

[56] References Cited

UNITED STATES PATENTS

| | | | |
|---|---|---|---|
| 3,056,085 | 9/1962 | James et al. | 179/15 AP |
| 3,297,951 | 1/1967 | Blasbalg | 324/77 H |
| 3,573,623 | 4/1971 | Bannon | 333/18 |
| 3,059,228 | 10/1962 | Beck et al. | 179/15 AP |

OTHER PUBLICATIONS

Lee, "An - - - PCM System - - - ," BSTJ, Jan. 1962, p. 1–24.

Burr–Brown, "Handbook of Op. Amp. Applications," 1963, p. 13, 55.

*Primary Examiner*—Maynard R. Wilbur

*Assistant Examiner*—Thomas J. Sloyan

*Attorney*—Willis M. Ertman

[57] ABSTRACT

A delay system for analog signals includes a digital-to-analog converter which is employed during a first portion of each cycle to convert an analog sample to binary form and during a second portion of each cycle to convert delayed binary signals to analog form. The binary signals are applied to dynamic storage through which the data is moved at a predetermined rate, and data is extracted from a particular output (selected as a function of the time delay desired) for application to the digital-to-analog converter for reconversion to analog form.

13 Claims, 11 Drawing Figures

Patented May 29, 1973 | 3,736,514

6 Sheets-Sheet 3

Patented May 29, 1973 3,736,514

6 Sheets-Sheet 5

SIGNAL PROCESSING APPARATUS

SUMMARY OF INVENTION

This invention relates to signal processing apparatus and more particularly to signal delay systems particularly useful in imposing time delays on continuous streams of analog information.

The delay of all or portions of a continuous stream of analog information is useful in a variety of applications. For example, in applications such as public address systems, a high level concentrated sound source frequently produces annoying echo effects. Such effects can be reduced or eliminated by employing a plurality of spaced loudspeakers and imparting delays in the electrical signal transmission times corresponding to the sound propagation time between the source and each loudspeaker effectively to create an unattenuated spherical, conical or plane sound wave. Mechanisms typically employed for this purpose have used a magnetic member such as a tape loop or a rotating magnetic drum, the signal delay being determined by the physical distance of the pickup head from the recording head and the speed of the magnetic member. Such devices require mechanical adjustment to change the amount of delay imposed on the signal and require considerable amounts of mechanical maintenance due to the moving components.

It is an object of this invention to provide novel and improved apparatus which allows an analog signal to be delayed for a substantial amount of time without deterioration.

Another object of the invention is to provide novel and improved variable delay apparatus for imparting variable time delays to analog signals which apparatus employ no moving parts such as tape loops or rotating magnetic discs.

A further object of the invention is to provide a novel and improved analog signal delay apparatus which enables selection of a wide range of precision time delay values merely through operation of selector switch mechanisms.

Still another object of the invention is to provide novel and improved apparatus useful, for example, in distributing audio signals in a manner to reduce or eliminate objectionable effects in public address systems.

In accordance with the invention there is provided a delay system for analog signals having input means and output means and which includes means coupled to the input means to sample an input signal at a repetition rate above its Nyquist frequency to generate a series of input signal samples, and means to generate a set of digital data signals representative of each input signal sample. The system further includes storing means through which data is entered and retrieved at a predetermined rate, the storing means having an input and a plurality of outputs. Successive sets of said digital data signals are continually applied to the input of said storing means and are extracted from a selected one of the outputs. The digital data signals from the selected output are then reconverted into corresponding analog signals and are applied to the output means.

In a particular embodiment the system includes control means that defines a major operation cycle which includes a first portion for generating the digital representation of the input signal sample and a second portion in which selected ones of the stored digital data signals are reconverted for application to the output means. Each major cycle is further subdivided into a series of minor cycles during each of which a plurality of timing signals are generated. Common digital-to-analog converter circuitry is employed in both the input and output portions of each major cycle, and in the minor cycle timing signals are used to perform multiplexing and demultiplexing operations on output signals from the dynamic memory. While the storing means could employ a variety of apparatus and techniques such as magnetic core memory or delay lines with or without memory interlace, shift register logic is employed in the dynamic memory in a preferred embodiment of the invention and digital signals representative of the audio signal input are stored in and synchronously moved through the shift register dynamic memory.

Further, in that embodiment, overload logic senses each binary input to the dynamic memory and provides an output indication if the binary values are either all ones or all zeros. The dynamic memory is composed of a series of stages and a first order output selection is a function of the memory stages while a second order output selection is a function of multiplexed signals from the selected memory stage. The input and output means each include analog signal conditioning circuitries that incorporate filter circuits and pre-emphasis and de-emphasis circuits. In accordance with a further feature of the invention, the input and output signal conditioning circuitries each have operational amplifier circuitry that includes an input impedance element and a feedback impedance element, the input impedance element in one of the operational amplifier circuitries and the feedback impedance element in the other operational amplifier circuitry being variable and the variable impedance elements being coupled together so that their impedance values track one another as they are adjusted, so that the internal signal level may be adjusted without affecting the overall input-output system gain.

The system is particularly useful for controlling excitation to output devices such as a system of loudspeakers with progressive delays corresponding to sound propagation times to create unattenuated spherical, conical or plane sound waves for a public address system, thus reducing or eliminating annoying echo effects generated by a high level concentrated sound source. In one embodiment employing a dynamic memory having delay line components and memory interlace techniques, delays of audio signals containing frequency components from 20 Hertz to 15 kilohertz in 10 millisecond steps up to 4 seconds are provided, while in a preferred embodiment delays of similar signals in 5 millisecond steps of up to 320 milliseconds in each of five channels are provided. Other examples of systems in which the invention may be usefully employed include other frequency spectrums and such applications as systems that monitor industrial process information and systems that monitor patient data in intensive care units. In such systems, for example, delay may be utilized to provide an opportunity to record particular portions of the continuous stream of analog information.

Other objects, features and advantages will be seen as the following description of a preferred embodiment progresses, in conjunction with the drawings, in which.

DESCRIPTION OF PARTICULAR EMBODIMENT

Figure 1:
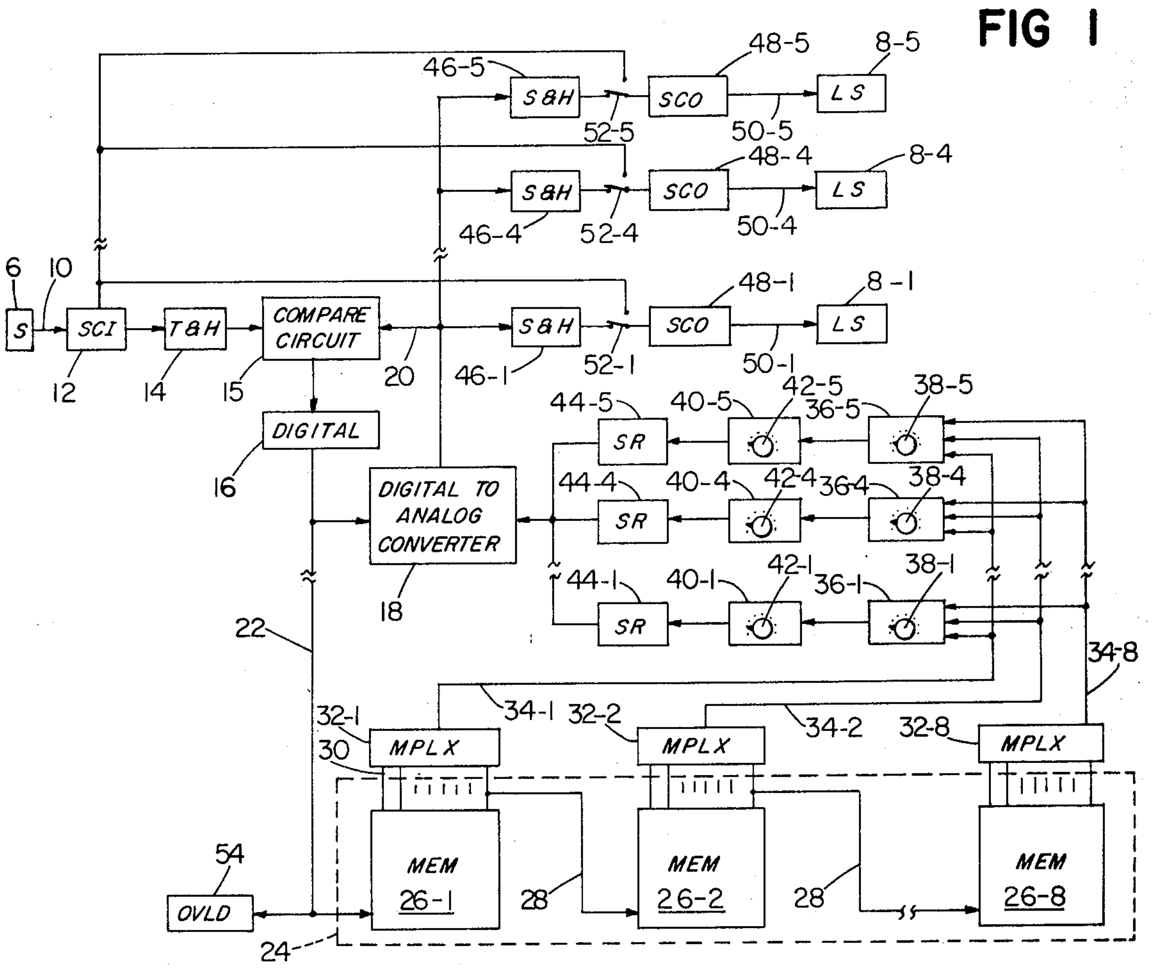
FIG. 1 is a block diagram of a delay system constructed in accordance with the invention.
Figure 2:
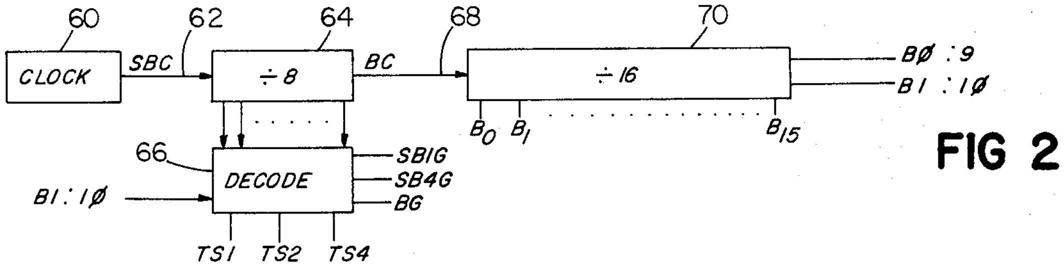
FIG. 2 is a block diagram of timing apparatus for generating control signals employed in the system shown in FIG. 1.

With reference to FIG. 1, 20 Hertz to 12 kilohertz input signal from source 6 is applied on input line 10 through signal conditioning circuitry (SCI) 12 which accepts the input signal, and filters out high frequency interference. The output of the signal conditioning circuitry 12 is applied to a track and hold circuit (T&H) 14 which has an output applied to compare circuitry 15. The output of compare circuit 15 is applied to digital logic 16 which in turn applies a signal to digital-to-analog converter logic 18 and that circuitry feeds back a signal over line 20 to compare circuitry 15 in an analog-to-digital encoding operation. Each analog signal sample is converted to a digital value by this circuitry and an output applied over line 22 to solid state dynamic memory 24 which includes eight modules 26 connected in series by lines 28. Each memory module 26 has eight output lines 30 which are applied to a multiplexing circuit (MPLX) 32 to provide a multiplexed output on line 34 of eight different signals. All eight output lines 34 are connected to each of the five coarse selection networks 36–1 – 36–5, each of which in response to the setting of its switch 38 selects signals on one of the eight input lines 34. The signals on the selected line are applied to fine selector circuitry 40 which, under the control of switch 42, selects one of the eight multiplexed signals from the selected memory module. That selected signal is applied serially to the corresponding shift register (SR) 44. The contents of each shift register are applied in parallel to digital-to-analog converter 18 in a digital-to-analog conversion operation to reconstitute the analog signal which is applied to the corresponding sample and hold logic circuit (S&H) 46 corresponding to the selected shift register generating that signal. The reconstituted audio signal stored by that sample and hold circuitry is then applied to corresponding output signal condition-ing circuitry (SCO) 48 to generate an analog signal on output line 50 for exciting output devices 8. A circuit including bypass switch 52 is connected between signal conditioners 12 and 48 to allow transmission of an input audio signal directly to a selected output line 50 without delay. In this system five different delays in 5 millisecond increments over the range of 0 to 320 milliseconds can be imposed on the input signal merely by setting selector switches 38, 42 and 52.

In an illustrative application, source 6 supplies a continuous analog signal to input line 10 and loudspeakers 8–1 – 8–5 are connected to corresponding output lines 50–1 – 50–5. By adjusting controls 38, 42 and 52 the excitations of loudspeakers 8 are delayed corresponding to sound propagation time between source 6 and the respective loudspeakers so that an unattenuated spherical, conical or plane sound wave for a public address system is effectively generated.

Figure 3:
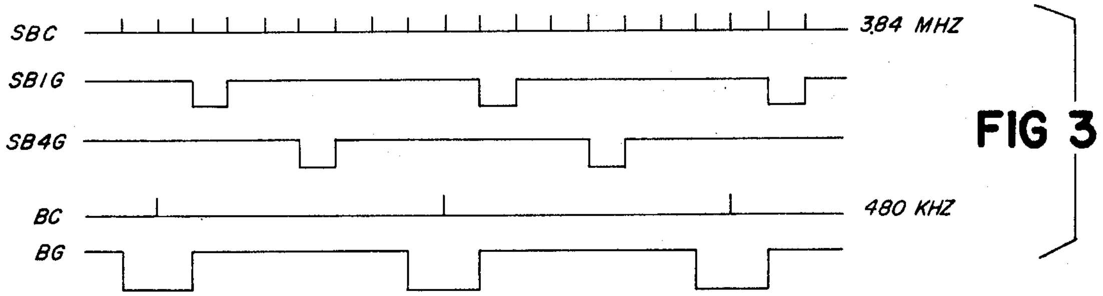
FIG. 3 is a timing diagram showing the timing relation of certain of the signals employed in the system shown in FIG. 1.
Figure 4:
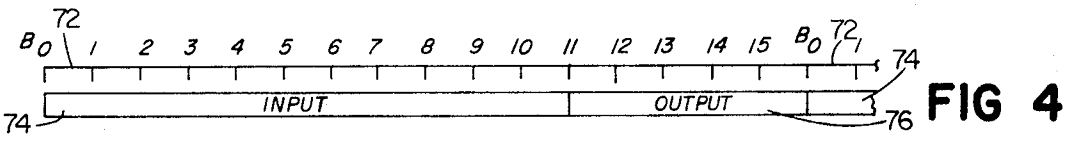
FIG. 4 is another timing diagram showing the relation of minor timing cycles and major timing cycles.

Additional details of the system will be seen with reference to FIGS. 2–9. The diagram of FIG. 2 indicates the basic timing control which includes a crystal oscillator clock 60 that provides an output train of SBC pulses on line 62 at 3.84 megahertz frequency. The SBC pulse train steps divide by eight counter 64 and its outputs applied to decoder 66 which generates the time slot control signals TS1, TS2 and TS4 (used in multiplexing and demultiplexing of data), and gating signal BG (used in the sample and hold logic). Decoded counts 0 and 3 from counter 64 are further clocked by flip flops to provide clean spike free output signals at count one (SB1G) and count four (SB4G) time. These two signals are used for dynamic memory (MOS shift register) control. Decoded count 7 (BC) is applied over line 68 to step divide by 16 counter 70 at a 480 kilohertz rate. The outputs of divide by 16 counter 70 are decoded as B0, B1, . . . B15 signals. Two additional control signals B0:9 and B1:10 are also generated. Counter 70 cycles at a 30 kilohertz rate which is the input signal sampling interval and its cycle is divided into an input function interval (B0:10) and an output function interval (B11:15). The timing relations between the outputs of counter 64 and decoder 66 (SBC, SB1G, SB4G, BC and BG) are indicated in FIG. 3 and the timing relations of the outputs of counter 70 are indicated in FIG. 4. As there indicated, there are eight SBC pulses in each minor cycle 72 and sixteen minor cycles in each major cycle. Each major cycle has an eleven minor cycle input portion 74 and a five minor cycle output portion 76.

Figure 5:
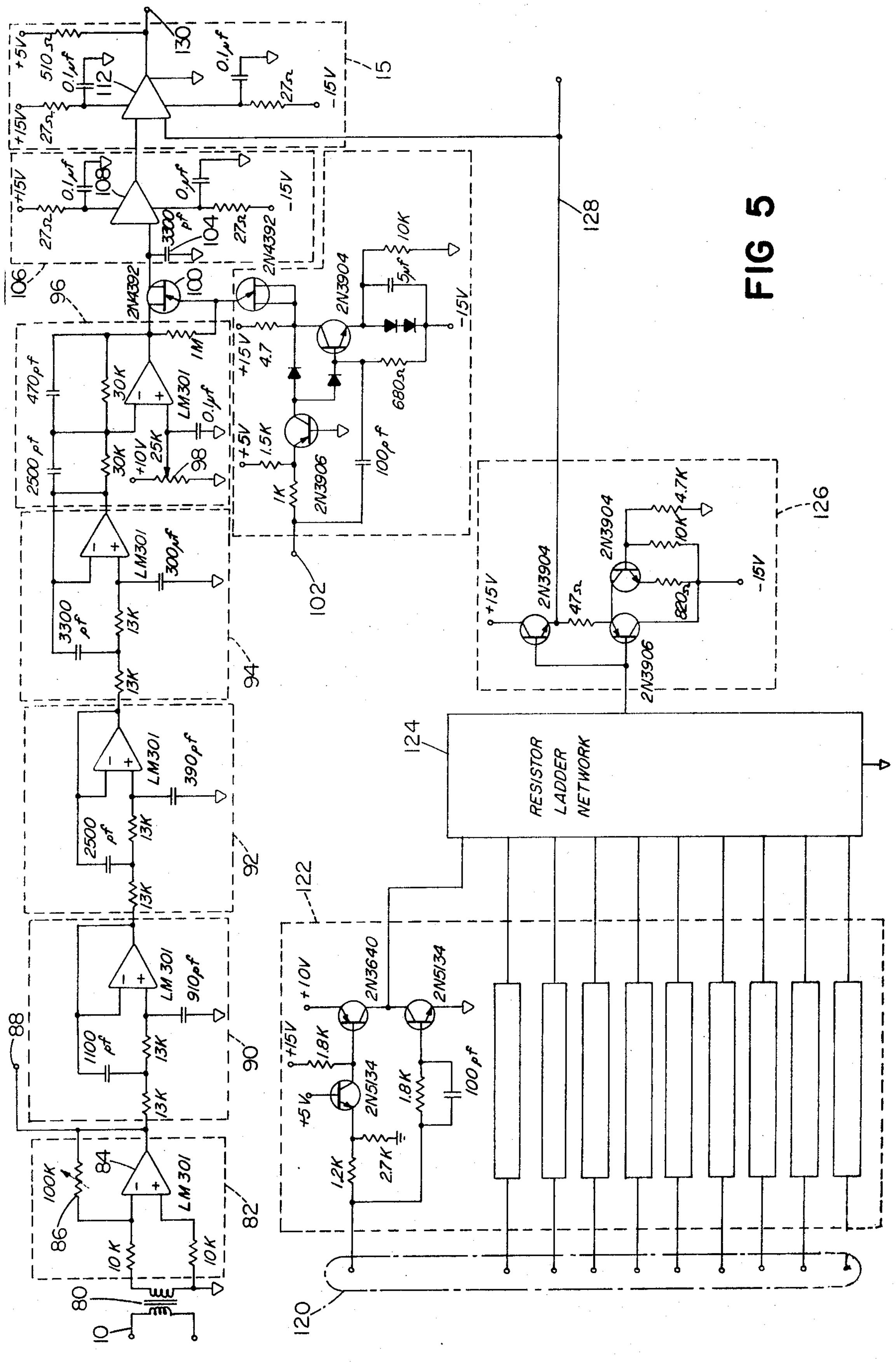
FIG. 5 is a schematic diagram of input signal and analog circuitry of the system shown in FIG. 1.

Additional details of the input signal conditioner 12, the track and hold circuitry 14 and the analog logic 18 are shown in FIG. 5. The input signal on line 10 is coupled by transformer 80 to adjustable gain amplifier 82 that includes operational amplifier 84 having adjustable feedback resistor 86. The output of amplifier 82 is applied to terminal 88 which is connected to bypass switches 52, and also applied through two low pass filter stages 90 and 92 which give a fourth order Butterworth characteristic, an aperture correction low pass filter stage 94 and a high frequency pre-emphasis amplifier stage 96. An adjustable potentiometer 98 connected in stage 96 provide a suitable DC offset so that the output of pre-emphasis amplifier stage 96 is +5 volts when no input is present, due to the use of a digital-to-analog converter which gives outputs in the range of 0 to +10 volts.

Connected to the output of the pre-emphasis amplifier via field effect transistor switch 100 is track and hold circuitry 14. The B0:9 signal is applied at terminal 102 to control switch 100, the track and hold circuit 14 tracking the output of amplifier 96 from B10–B15 time and switch 100 being open so that capacitor 104 holds the signal during the B0:B9 interval. The amplified input signal stored in capacitor 104 of the track and hold circuit is sensed by high input impedance amplifier stage 106 that includes operational amplifier 108 and applied to one input of operational amplifier 112. A signal from digital logic 16 applied at terminals 120 of digital-to-analog converter logic 18 is coupled by switch logic 122, ladder network 124 and booster amplifier 126 over line 128 to the second input of the operational amplifier 112. Comparison circuit 15 has an output on line 130 when the signal on line 128 is higher than the signal held on capacitor 104.

Figure 6:
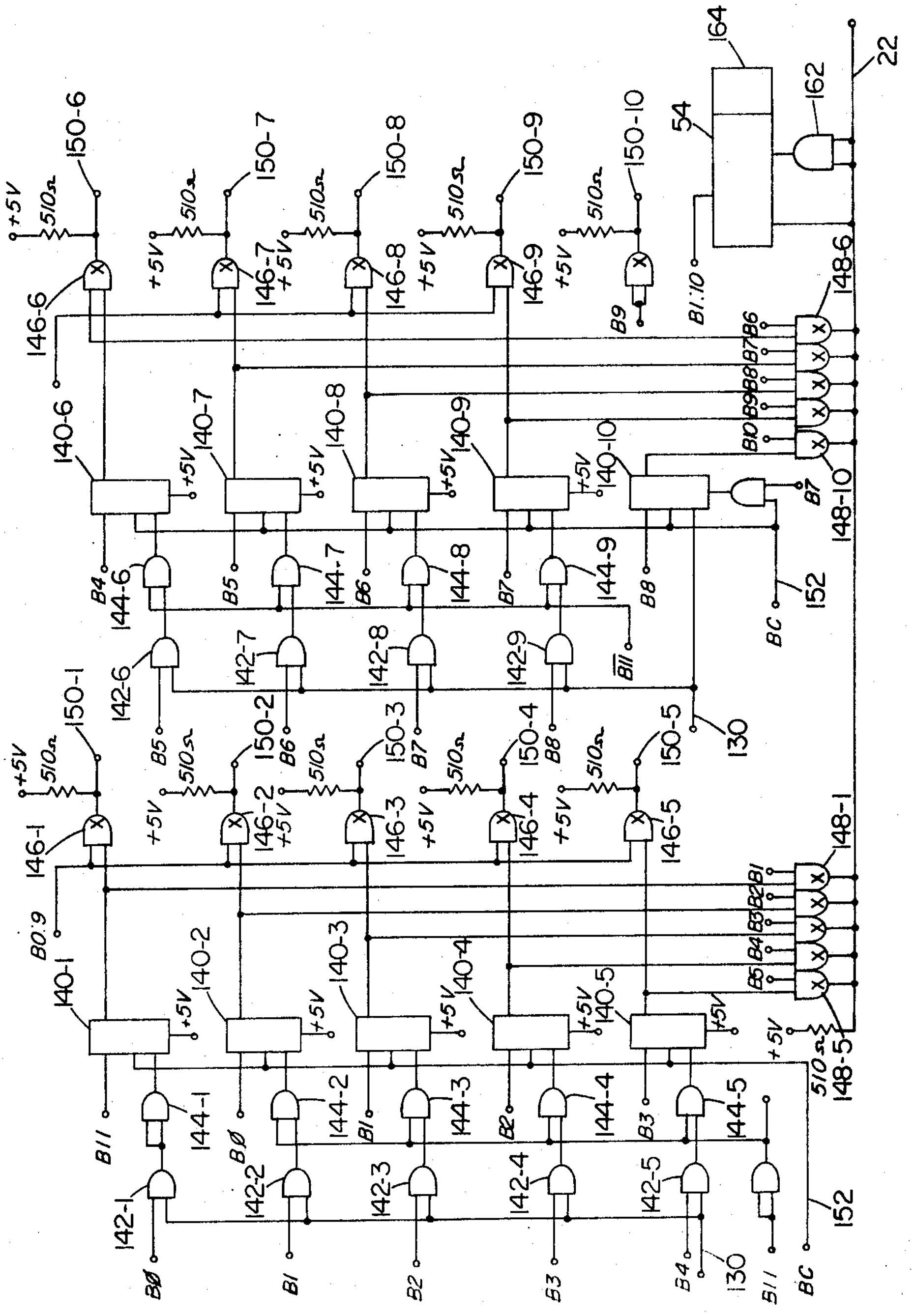
FIG. 6 is a logic diagram of the digital storage register logic employed in the system shown in FIG. 1.

Additional details of the digital logic 16 are shown in FIG. 6. That logic includes 10 flip flops 140–1 – 140–10, each flip flop having input logic units 142 and 144 and output logic units 146 and 148 associated therewith. Output terminals 150 are connected to converter input terminals 120 (FIG. 5). At B11 time flip flop 140–1 is set and the other nine flip flops are cleared so that the setting of the digital register 16 is 1000000000. This signal is applied through terminal logic 120, switch stages 122, ladder network 124 and booster amplifier 126 to provide a +5 volt signal on line 128. If the analog input voltage from amplifier 106 is less, compare circuit 100 generates an output on line 130 which via logic circuit 142–1 conditions flip flop 140–1 to be cleared in response to the BC pulse on line 152. That pulse also sets flip flop 140–2 in response to the B0 conditioning signal on set input 154–2. During the B1 cycle, this operation is repeated as a second comparison and if compare circuit 110 has an output, flip flop 140–2 is cleared. Also in the B1 cycle, the output of flip flop 140–1 is gated through gate 148–1 for application on output line 22. This process of successive approximation is continued through the B9 cycle at the end of which register 16 contains a 10 bit digital representation of the analog output of the signal conditioning circuitry 12. This digital representation is read out serially over line 22 for application to memory 24 during the B1:10 interval. Coupled to line 22 is inverter 162 and overload logic 54. If the stream of bits on line 22 is either all ones or all zeros, a flip flop detector in overload logic 54 senses the condition and fires a one-shot to produce an output signal which energizes overload indicator 164.

Figure 7B:
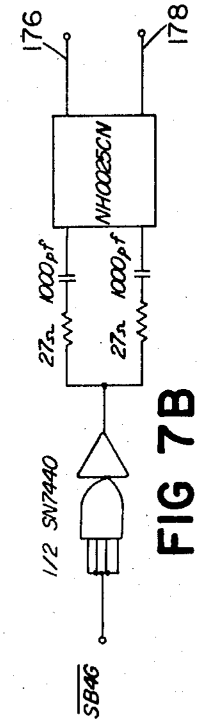
FIGS. 7A and 7B are diagrams of shift register drive logic employed with the dynamic memory shown in FIG. 7.
Figure 7A:
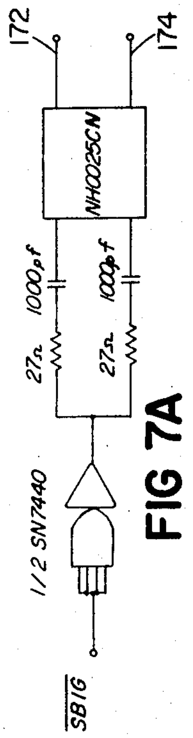
Figure 7:
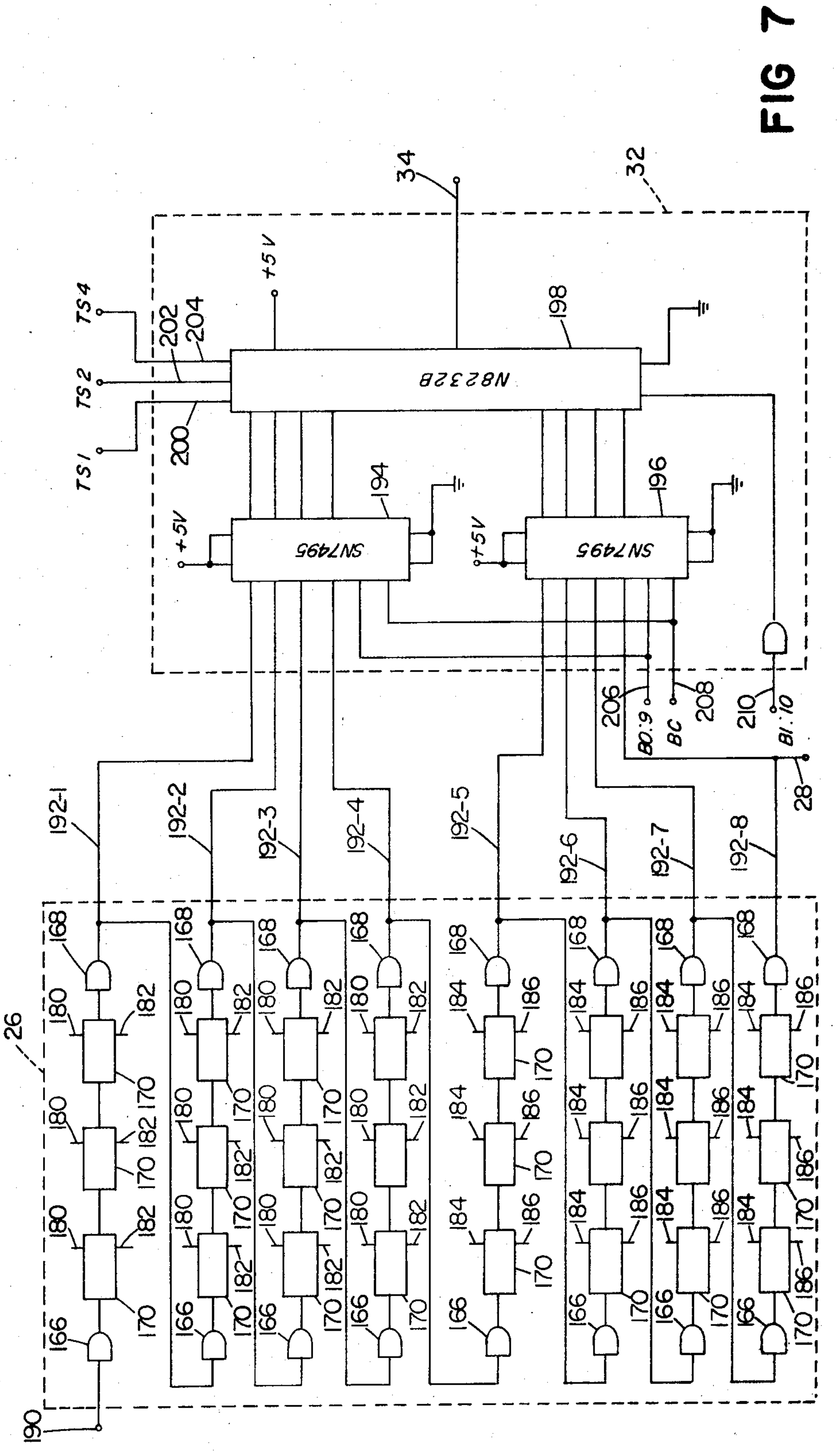
FIG. 7 is a block diagram of one of the modules of the dynamic memory and associated multiplexing logic employed in the system shown in FIG. 1.

Details of one module 26 of the dynamic shift register memory 24 are shown in FIG. 7. As indicated above, there are eight memory units or modules 26. Each memory module consists of input and output interface units 166, 168 (1/6 SN7404 unit each) and eight groups of three Type MM5016 MOS shift register units 170 connected in series so that each such group has a storage capacity of 1,500 bits. Logic indicated in FIGS. 7A and 7B responds to $\overline{\text{SB1G}}$ and $\overline{\text{SB4G}}$ signals and provides shift register drive signals at output terminals 172, 174, 176, 178 that are applied to drive lines 180, 184, 182 and 186 respectively. Each memory section has a capacity of 150 10 bit words, each memory module a capacity of 1,200 words and the entire memory 24 a capacity of 9,600 words. While the bits are stepped from the analog-to-digital converter logic at a 480 kilohertz rate, those bits are applied to memory only during time B1–B10, the next five bit times (B11–B15) being used for output. Thus the effective shift register stepping rate is 300 kilohertz. As each shift register section in the memory is 1,500 bits in length, it takes 5 milliseconds for a word to pass through a memory unit section. Each memory module has an input line 190 and eight output lines 192, output line 192–8 being connected to the first memory section of the next memory module.

All eight outputs of a memory module are applied to multiplexing logic 32 that includes storage logics 194, 196 and multiplexing logic 198 which responds to the time slot signals TS1, TS2 and TS4 on line 200, 202 and 204. During the timing interval B0:9 (line 206) in response to each BC pulse (line 208) the bit conditions at terminals 192–1–8 are applied to multiplexing logic 198 and during the timing interval B1:B10 (line 210) under the control of time slot signals TS1, TS2 and TS4 to provide a single multiplexed output on line 34 of the eight tap signals.

Figure 8:
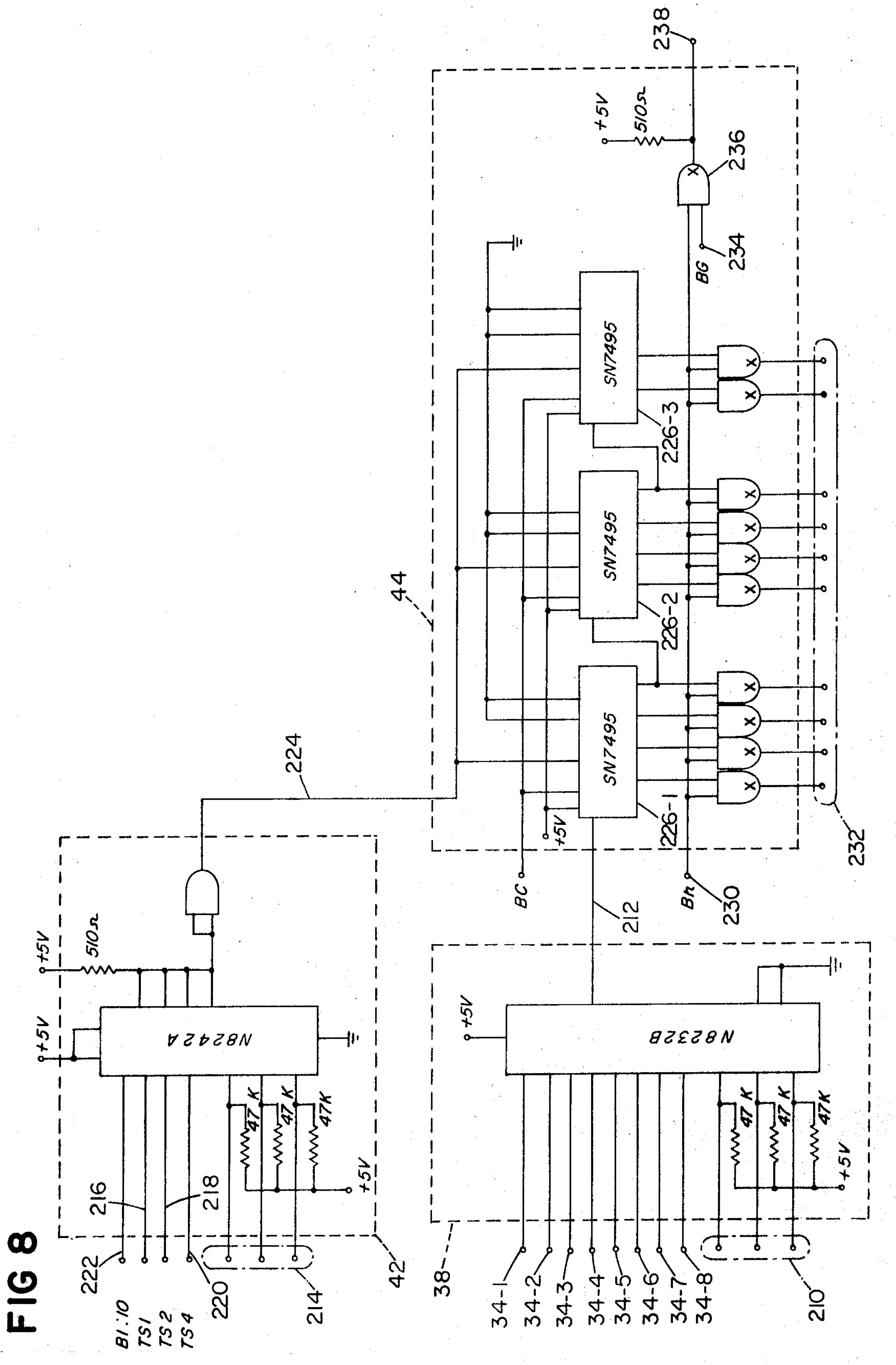
FIG. 8 is a logic diagram of demultiplexing logic employed in the system shown in FIG. 1.

The signals on each of the eight output lines 34 are applied to five selection channels, details of a portion of one being shown in FIG. 8. The coarse selector network 38 responds to signals on lines 210 from selector switch 40 and selects one of the trains of multiplexed signals on lines 34–1 – 34–8 and applies that signal train to the output line 212. The fine selector network 42 responds to signals from selector switch 44 on lines 214 and selects a corresponding one of eight time slots as a function of TS1, TS2 and TS4 signals on line 216, 218 and 220 during the B1:10 interval (line 222) to generate a shift enable signal on line 224 which steps the shift register 44 at the time corresponding to the selected time slot to select one of the eight multiplexed signals on line 212 for transfer into shift register 44. The shift register includes three type SN7495 logic units 226–1 – 226–3 (only two outputs of unit 226–3 being used). Shifting occurs during the B1:10 time and at the end of that interval, shift register 44 contends a 10 bit representation.

Figure 9:
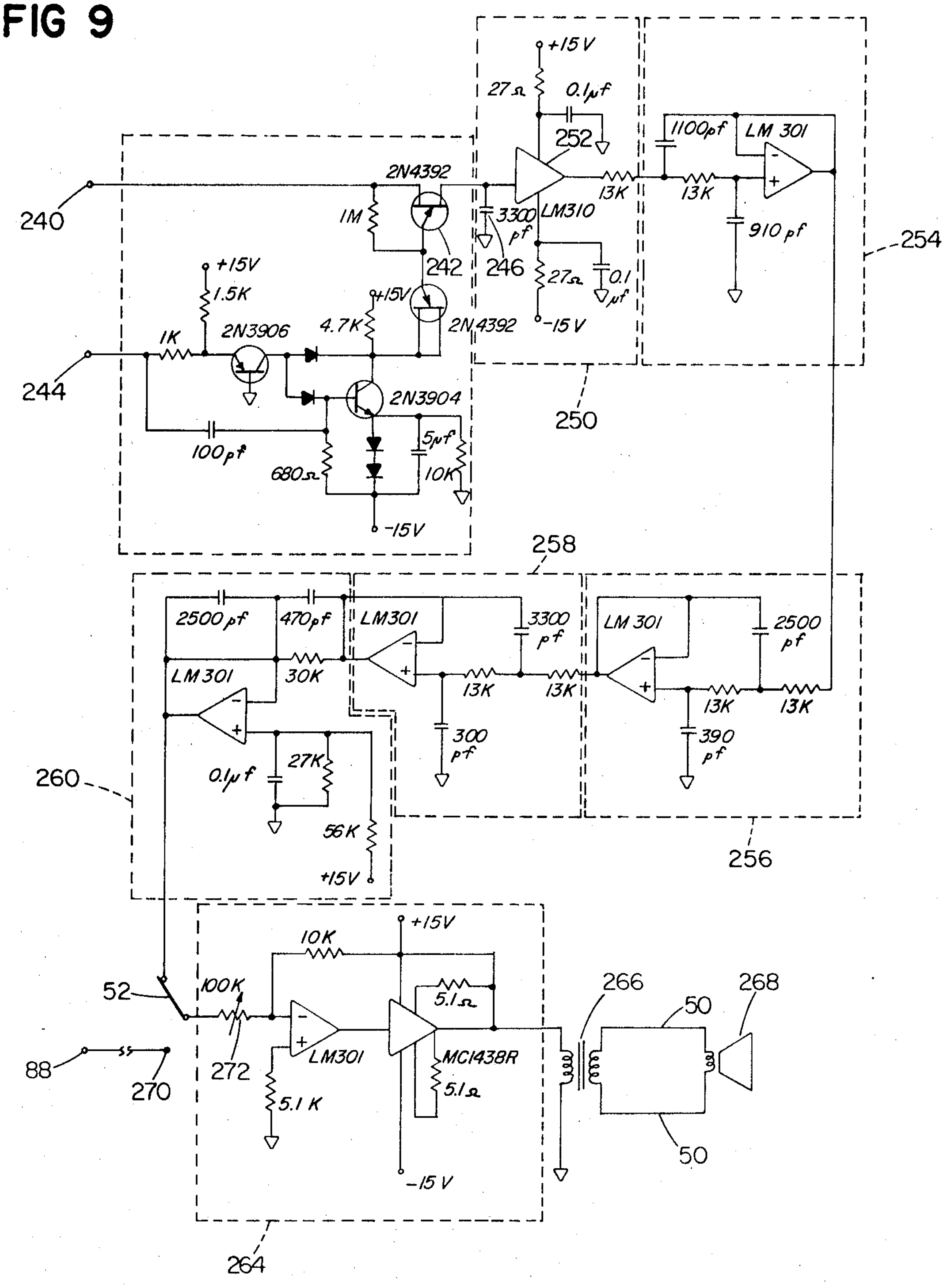
FIG. 9 is a schematic diagram of the output signal circuitry employed in the system shown in FIG. 1.

As a function of the particular selection channel, a corresponding gating signal (B11–B15) is applied on line 230 to read out the contents of shift register 44 over lines 232 to d-a converter 18 and more particularly to terminals 120 (FIG. 5). The BG signal on line 234 through AND logic 236 also generates a signal on line 238. The d-a converter generates an output on line 128 which is gated to the corresponding storage circuit 46, details of a typical one of which are shown in FIG. 9. The output signal on line 128 is applied to line 240 for application to field effect transistor switch 242, which is controlled by a signal applied at terminal 244, thus being the signal on line 238 that was gated by the BG signal on line 234 (FIG. 8). As a result, the analog value is stored on capacitor 246 during the corresponding one of the minor cycles B11–B15. The output signal conditioning circuitry 48 includes high impedance amplifier 250 that includes operational amplifier 252, two power supply filter stages 254, 256, an aperture correction filter stage 258 and a de-emphasis amplifier stage 260. The output of the de-emphasis stage 260 is passed through switch 52, power amplifier stage 264 and transformer 266 to loudspeaker 268 or other appropriate output device connected to line 50.

Bypass switch 52 has a second terminal 270 that is connected to terminal 88 and allows the delay circuitry to be completely bypassed. Also, adjustable input resistance 272 in power amplifier stage 264 is ganged with feedback resistor 86. The resistance values of elements 86 and 272 track one another so that as they are adjusted the overall net gain of the system remains constant irrespective of the setting of these two variable resistors, thus allowing adjustment of signal level within the delay circuitry without changing the overall system gain.

This invention is particularly useful in selectively and concurrently imposing several delays on continuous information in the audio frequency spectrum. In the described embodiment various delays, in 5 millisecond intervals, may be selected over a range of zero to 320 milliseconds merely through selective operation of a bypass switch or two delay selection switches in each channel. The system provides a simple, reliable, easily varied audio signal delay system.

While a particular embodiment of the invention has been shown and described, various modifications thereof will be apparent to those skilled in the art. Therefore it is not intended that the invention be limited to the disclosed embodiment or to details thereof and departures may be made therefrom within the spirit and scope of the invention as defined in the claims.

What is claimed is:

1. A variable delay system for analog signals comprising input means, output means, means coupled to said input means to sample an input signal at a repetition rate above its Nyquist frequency to generate a series of input signal samples, means to generate a set of digital data signals representative of each said input signal sample, dynamic shift register storing means, pulse means for shifting data through said shift register storage means at a predetermined rate, said shift register storing means having an input and a multiplicity of outputs, said outputs being arranged in a plurality of groups, multiplexing means coupled to each said group of outputs, each said multiplexing means applying signals from said group of outputs on a single output line, means for continually applying successive sets of said digital data signals to the input of said storing means, means for selecting one of said outputs comprising first selector means coupled to all of said multiplexing means output lines for selecting one of said output lines, and second selector means coupled to said first selector means for selecting one of the signals on the selected output line in response to signals from said pulse means, means for reconverting said stored digital data signals from said selected output line into corresponding analog signals, and means for applying said corresponding analog signals to said output means such that said corresponding analog signals are delayed relative to said input signal by an amount which is determined by said selector means.

2. The apparatus as claimed in claim 1 and further including an input signal conditioner connected between said input and said sampling means and an output signal conditioner connected between said digital-to-analog converter and said output means, each said conditioner including operational amplifier circuitry including an input impedance element and a feedback impedance element, the input impedance element in one of said operational amplifier circuitries and the feedback impedance element in the other operational amplifier circuitry being variable and said variable impedance elements being coupled together so that their impedance values track one another as they are adjusted.

3. The apparatus as claimed in claim 1 wherein said means to generate a digital signal representative of each input signal sample includes a register for storing a multibit digital word and digital-to-analog converter apparatus coupled to said sampling means for modifying successive bit values in said register as a function of the input signals sample in a series of operations.

4. The apparatus as claimed in claim 1 and further including system control means defining a major operation cycle, each said major operation cycle including a first portion in which a digital signal representative of each said input signal sample is generated and a second portion in which said reconverting means is employed for reconverting selected stored digital data signals for application to said output means.

5. The apparatus as claimed in claim 4 wherein said system control means further defines a series of minor cycles in each said major operation cycle, a plurality of said pulse signals are generated during each said minor cycle, and each said multiplexing means is responsive to said pulse signals for generating a multiplexed output signal from said dynamic storing means.

6. The apparatus as claimed in claim 1 and further including overload logic for sensing each said set of digital data signals and providing an output if all the signals in the sensed set of signals are of the same value.

7. A delay system for analog signals comprising digital-to-analog converter means, system control means defining a major operation cycle, input means, output means, means coupled to said input means to sample an input signal at a repetition rate above its Nyquist frequency to generate a series of input signal samples, means responsive to said system control means to cause said digital-to-analog converter means to generate a set of digital data signals representative of each said input signal sample during a first portion of each said major operation cycle, digital storing means through which data is entered and retrieved at a predetermined rate, said storing means having an input and a series of memory stages, each said memory stage being composed of a plurality of serially connected shift register components and each shift register component having an output, multiplexing means connected to each said memory stage, each said multiplexing means being connected to the shift register component outputs of its stage for generating a multiplexed digital data output signal from its memory stage, means responsive to said system control means for continually applying successive sets of said digital data signals to the input of said storing means, retrieval means responsive to said system control means for retrieving said stored digital data signals comprising first order selection means coupled to all of said multiplexing means for selecting the output of one of said multiplexing means, and second order selection means for selecting one of the digital data signals of the selected multiplexed output signals, means for applying said selected digital data signals to said digital-to-analog converter means for reconverting said retrieved data signals into corresponding analog signals during a second portion of each said major operation cycle, and means for applying said corresponding analog signals to said output means such that said corresponding analog signals are delayed relative to said input signal by an amount which is determined by said selection means.

8. The apparatus as claimed in claim 7 wherein said input means includes a first storage capacitor for storing a charge representative of each said input signal sample during said first portion of each major operation cycle and said output means includes a second storage capacitor for storing a charge representative of said reconverted analog signal during said second portion of each said major operation cycle.

9. The apparatus as claimed in claim 7 wherein said means to generate a digital signal representative of each input signal sample includes a register for storing a multibit digital word and said digital-to-analog converter apparatus is coupled to said sampling means for modifying successive bit values in said register as a function of the input signals sample in a series of operations.

10. The apparatus as claimed in claim 7 and further including overload logic for sensing each said set of digital data signals and providing an output if all the signals in the sensed set of signals are of the same value.

11. The apparatus as claimed in claim 7 wherein said system control means further defines a series of minor cycles in each said major operation cycle, means to generate a plurality of timing signals during each said minor cycle, and said digital-to-analog converter means, said multiplexing means and said second order selection means are responsive to said timing signals for generating said digital data signals, said multiplexed output signal and said selected digital data signal.

12. The apparatus as claimed in claim 11 and further including an input signal conditioner connected between said input and said sampling means and an output signal conditioner connected between said digital-to-analog converter and said output means, each said conditioner including operational amplifier circuitry including an input impedance element and a feedback impedance element, the input impedance element in one of said operational amplifier circuitries and the feedback impedance element in the other operational amplifier circuitry being variable and said variable impedance elements being coupled together so that their impedance values track one another as they are adjusted.

13. The apparatus as claimed in claim 11 wherein said retrieval means includes a plurality of selection channels and said output means includes a corresponding plurality of output channels, each said selection channel including a first order selection means and a second order selection means, and means for causing said digital-to-analog converter means to convert the retrieved data signals from each selection channel into corresponding analog signals and to apply those analog signals to the corresponding output channel during a corresponding minor cycle in the second portion of said major operation cycle.

* * * * *